United States Patent
Tornquist et al.

(10) Patent No.: US 6,979,929 B2
(45) Date of Patent: Dec. 27, 2005

(54) SYSTEM AND METHOD FOR RETAINING WEDGES IN A ROTOR

(75) Inventors: Gerald E. Tornquist, Tucson, AZ (US); James D. Lengel, Oro Valley, AZ (US); Raymond W. Borden, Farmingdale, NJ (US); Kieran P. J. Doherty, Oro Valley, AZ (US); Ming Xu, Tucson, AZ (US); WuenFar L. Chen, Tucson, AZ (US); Gregor J. S. McDowall, Tucson, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/869,553

(22) Filed: Jun. 15, 2004

(65) Prior Publication Data

US 2004/0232795 A1 Nov. 25, 2004

Related U.S. Application Data

(62) Division of application No. 09/948,866, filed on Sep. 7, 2001, now Pat. No. 6,791,230.

(51) Int. Cl.$^7$ .......................... H02K 15/02; H02K 3/46
(52) U.S. Cl. ...................... 310/214; 310/261; 310/262; 310/194
(58) Field of Search ................. 310/214, 194, 310/156.55–156.61, 42

(56) References Cited

U.S. PATENT DOCUMENTS

| 1,067,782 | A | * | 7/1913 | Field .......................... 310/262 |
| 4,990,810 | A | * | 2/1991 | Newhouse .................. 310/194 |
| 5,036,238 | A | * | 7/1991 | Tajima ....................... 310/214 |
| 6,054,790 | A | * | 4/2000 | Kjeer et al. ................. 310/214 |
| 6,113,024 | A | * | 9/2000 | Pittard et al. .............. 242/433 |
| 2004/0263019 | A1 | * | 12/2004 | Buchan et al. ............. 310/214 |

* cited by examiner

Primary Examiner—Darren Schuberg
Assistant Examiner—J. Aguirrechea
(74) Attorney, Agent, or Firm—Ingrassia Fisher & Lorenz

(57) ABSTRACT

A rotor with wedges and a method of retaining wedges in a rotor are disclosed. The rotor includes a shaft, first and second poles extending radially from the shaft, and first and second coils of windings respectively wrapped around the first and second poles. Each coil includes a respective outer face including two end portions and two side portions, and a respective inward-facing edge including two end sections and two side sections. The rotor further includes a first outer wedge positioned between neighboring side portions of the first and second coils, and a first inner wedge positioned between neighboring side sections of the first and second coils. The first inner wedge is coupled to the first outer wedge so that the first outer wedge is at least partly retained from moving radially outward away from the shaft.

4 Claims, 5 Drawing Sheets

SYSTEM AND METHOD FOR RETAINING WEDGES IN A ROTOR

CROSS-REFERENCE TO RELATED APPLICATIONS

This application is a divisional of Ser. No. 09/948,866 filed on Sep. 7, 2001 now U.S. Pat. No. 6,791,230.

FIELD OF THE INVENTION

The present invention relates to high speed generators and, more particularly, to the structure of the rotors on such generators.

BACKGROUND OF THE INVENTION

Generator systems that are installed in aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, electrical aircraft systems.

Because the generators installed in aircraft will often be variable frequency generators that rotate in the speed range of 12,000 rpm to 24,000 rpm, large centrifugal forces are imposed upon the rotors of the generators. Given these stressful operating conditions, the rotors of the generators must be carefully designed and manufactured, both so that the rotors are reliable and also so that the rotors are precisely balanced. Improper balancing in particular not only can result in inefficiencies in the operation of the generators, but also potentially risk failures in the generators.

Among the important components in rotors that must be carefully designed and manufactured in order to guarantee reliability and proper balancing of the rotors are the wire coils of the rotors. The centrifugal forces experienced by the rotors are sufficiently strong as to cause bending of the wires of these coils, which over time can result in mechanical breakdown of the wires. Additionally, because the coils are assemblies of individual wires that can move to some extent with respect to one another and with respect to the remaining portions of the rotors, the coils constitute one of the significant potential sources of imbalance within the rotors. Even asymmetrical movements of these coils on the order of only a few thousandths of an inch can be significant.

In order to improve the strength and reliability of the wire coils and to minimize the amount of imbalance in the rotors that occurs due to the wire coils, wedges may be inserted in between neighboring poles of the rotors. The wedges in particular serve as physical barriers beyond which the wires of the coils cannot bend or move, and in many embodiments provide some pressure onto the coils that helps to maintain the physical arrangement of the coils.

Although the wedges employed in conventional rotors are capable of providing these benefits to some extent, the design of these conventional rotors and wedges limits the wedges' effectiveness. Just as the wires of the coils of a rotor experience high centrifugal forces as the rotor rotates at high speeds, the wedges also experience high centrifugal forces. These forces tend to cause the wedges to spread radially outward away from the shaft of the rotor during operation, thus limiting the wedges ability to confine and place pressure upon the wire coils. Particularly, insofar as the axial lengths of conventional rotors are often relatively large in comparison with the diameters of the rotors, the centrifugal forces often tend to cause significant radial deflection or flexure of the wedges near their axial midpoints.

In order to prevent the wedges from spreading radially outward, many conventional rotors employ bands around the circumferences of the rotors to retain the wedges. In other conventional rotors, an "underwedge" system is employed in which the wedges extend in their arc length all of the way between neighboring pole tips on the rotors, and snap rings are then employed to hold the wedges in place relative to the poles.

Yet these conventional structures for retaining wedges in place on rotors are limited in their effectiveness. Both the bands used to retain the wedges and the components of the underwedge systems (particularly the snap rings) also can suffer from bending during operation of the rotors. Because these devices suffer bending, the devices can only provide a limited amount of counteracting force to keep the wedges in place, and further can create additional imbalance in the rotors. Additionally, because it is difficult to accurately control the positioning of, and the amount of pressure applied by, the bands and underwedge componentry, it is difficult to accurately set and maintain the positioning of the wedges and to control the concentricity of the various wedges around the rotors.

Hence, there is a need for a new system and method for retaining wedges in a rotor. In particular, there is a need for a new system and method that allows for sufficient radial retention of the wedges of the rotor even at high speeds of operation, so that the wedges continue to provide support for and direct pressure towards the wire coils throughout operation of the generator. Further, it would be advantageous if the new system and method did not require components that had a tendency to bend in such a way as to create imbalance in the rotor. It would additionally be advantageous if the system and method allowed for the accurate positioning of wedges onto the rotor so as to provide concentricity of the rotor and its wedges. It would further be advantageous if the system was designed so as to allow the wedges to conduct heat away from the coils. It would additionally be advantageous if the system and method were relatively simple and inexpensive to implement.

SUMMARY OF THE INVENTION

The present inventors have recognized that conventional rotor wedges that are supported by bands or underwedge componentry near the circumference of a rotor can be replaced by two-wedge sets that each include an outer wedge and an inner wedge, where the inner wedges retain the outer wedges in their positions relative to the central axis of the rotor. The outer wedges, like conventional rotor wedges, expand in cross section as one moves radially outward from the shaft of the rotor. The outer wedges extend between neighboring poles of the rotor, and thereby provide support for, and direct pressure towards, the wire coils of those poles. The inner wedges are positioned radially inward from the corresponding outer wedges and are coupled to the outer wedges. The inner wedges expand in cross section as one moves radially inward toward the shaft of the rotor and rest upon the sides of the wire coils of neighboring poles. Consequently, the inner wedges are blocked from moving radially outward by the sides of the wire coils, and the sides of the wire coils provide the centripetal force necessary for restraining the inner and outer wedges in place. To the extent that any radial movement of the wedges does occur, the movement can only occur when accompanied by increased pressure applied on the coils. Further, the inner wedges and outer wedges can be coupled to one another by fastening devices that allow for variation in the relative positioning of the inner and outer wedges, and therefore allow for concentricity control.

In particular, the present invention relates to a rotor including a shaft extending along an axis through the rotor, first and second poles extending radially from the shaft, and first and second coils of wire windings respectively wrapped around the first and second poles. Each coil includes a respective outer face including two end turn portions and two side portions, and a respective inward-facing edge including two end turn sections and two side sections. The rotor further includes a first outer wedge positioned between a first of the side portions of the first coil and a first of the side portions of the second coil, and a first inner wedge positioned between a first of the side sections of the first coil and a first of the side sections of the second coil. The first inner wedge is coupled to the first outer wedge and provides support thereto so that the first outer wedge is at least partly retained from moving radially outward away from the shaft.

The present invention additionally relates to a high speed generator comprising a stator and a rotor, where the rotor includes a shaft extending along an axis through the rotor, a plurality of poles extending radially from the shaft, and a plurality of coils of wire windings. Each coil is wrapped around a respective one of the poles, and each coil includes a respective outer face formed by a respective outermost layer of wire windings of the respective coil and a respective pair of first and second edges. The respective outer face includes two end turn portions and two side portions, the first edge faces inward toward the shaft, the second edge faces outward away from the shaft, and each of the first and second edges includes two end turn sections and two side sections. The rotor additionally includes a plurality of outer wedges, where each outer wedge is positioned between a respective pair of the coils that neighbor one another so that the respective outer wedge is positioned between one of the side portions of a first coil of the respective pair and one of the side portions of a second coil of the respective pair. The rotor further includes a plurality of inner wedges, where each inner wedge is positioned between a respective pair of the coils that neighbor one another so that the respective inner wedge is positioned between one of the side sections of the first edge of a first coil of the respective pair and one of the side sections of the first edge of a second coil of the respective pair. The rotor additionally includes a means for coupling the respective inner wedges to the respective outer wedges.

The present invention further relates to an outer wedge for placement in a rotor assembly of a high speed generator. The outer wedge includes a main body that is substantially trapezoidal in cross-section and hollow. The main body additionally includes a pair of supports internal to the main body and respectively proximate each end of the main body. The outer wedge further includes a pair of end pieces, also having a substantially trapezoidal cross-section, where the end pieces are coupled to the supports by axial screws and further include holes by which coolant can be conducted through the end pieces.

The present invention additionally relates to an inner wedge for placement in a rotor assembly of a high speed generator. The inner wedge includes a main body having a substantially trapezoidal shape including a longer side, a shorter side, and two connecting sides. The main body is configured to be positioned between a pair of opposing side sections of a pair of coils of a pair of neighboring poles of the rotor assembly, and is configured to be coupled to an outer wedge.

The present invention further relates to a method of adjusting concentricity of a rotor in a high speed generator, where the rotor has coils of wire windings wrapped around respective poles of the rotor, and each coil includes a respective outer face having two end turn portions and two side portions. The method includes positioning inner wedges between opposing sides of the coils of neighboring poles, where the inner wedges have one or more first threaded openings. The method additionally includes positioning outer wedges between opposing side portions of the coils of neighboring poles, where the outer wedges have one or more second threaded openings collocated with the first threaded openings. The method further includes placing one or more threaded fasteners into collocated first and second threaded openings, and adjusting concentricity of the rotor by adjusting the threaded fasteners.

The present invention additionally relates to a method of retaining wedges of a rotor from moving radially outwards away from a shaft of the rotor during rotation of the rotor. The method includes wrapping coils of wire windings around respective poles of the rotor, where each coil includes a respective outer face including two end turn portions and two side portions, and further includes a respective inward-facing edge including two end turn sections and two side sections. The method additionally includes positioning inner wedges between opposing side sections of the coils of neighboring poles, positioning outer wedges between opposing side portions of the coils of neighboring poles, and coupling the outer wedges to the inner wedges through the use of fastening devices.

Other features and advantages of the high speed generator will become apparent from the following detailed description, taken in conjunction with the accompanying drawings, which illustrate, by way of example, the principles of the invention.

DETAILED DESCRIPTION OF THE INVENTION

Figure 1:
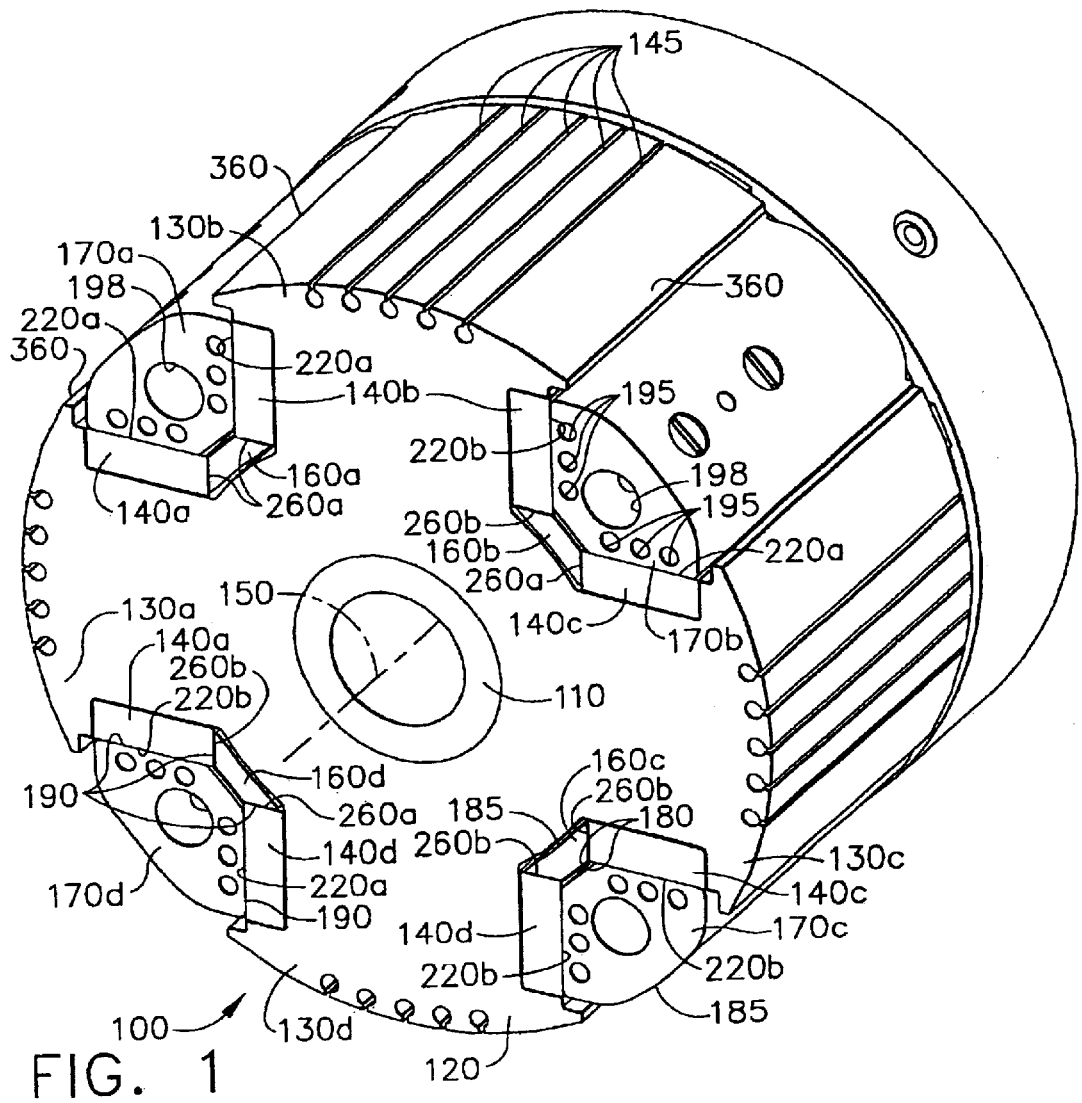
FIG. 1 is a perspective, cross-sectional view of a rotor employing a plurality of outer wedges and a plurality of inner wedges for retaining the outer wedges.

Referring to FIG. 1, a perspective, cross-sectional view of a rotor 100 in accordance with one embodiment of the present invention reveals a central shaft 110 that is surrounded by a plurality of laminations 120 that form a core of the rotor 100. The laminations 120 form four poles 130a–d. Around each of the respective poles 130a–d is wrapped a respective coil of wire windings 140a–d. Further shown as being embedded within the poles 130a–d are weights 145 that are used to provide proper balancing of the rotor 100.

Figure 2:
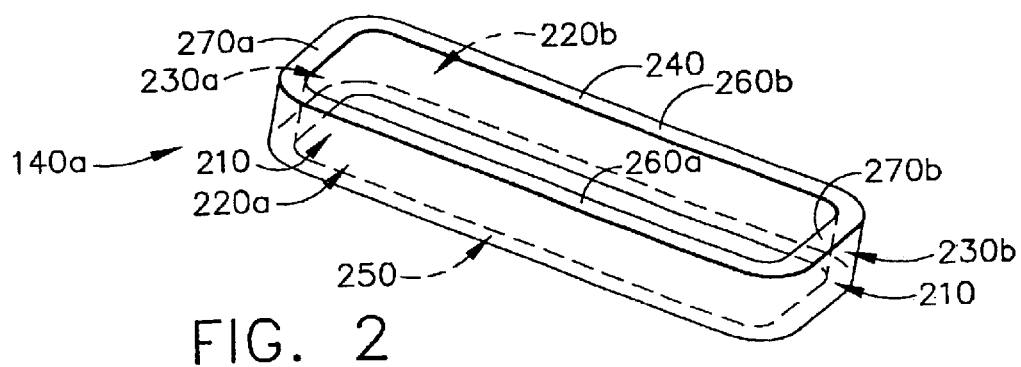
FIG. 2 is a perspective view of a wire coil such as that employed on the rotor of FIG. 1.

Referring to FIG. 2, the coil 140a (representative of each of the coils 140a–d) includes an outer face 210 around the outer perimeter of the coil that is formed from the outermost layer of wire windings of the coil. The outer face 210 includes two side portions 220a,b and two end turn portions 230a,b. The side portions 220a,b are made up of wire segments that are wrapped across the sides of the pole 130a and that predominantly follow directions parallel to the axis 150. The end turn portions 230a,b in contrast are made up of wire segments that loop around the ends of the pole 130a and that follow paths that are predominantly within planes that are perpendicular to the axis 150. Additionally, the coil 140a includes an inward-facing edge 240 and an outward-facing edge 250, where the inward-facing edge faces the shaft 110 and the outward-facing edge faces away from the shaft. The inward-facing and outward-facing edges 240, 250 are roughly annular in shape. The inward-facing edge 240 includes two side sections 260a,b and two end turn sections 270a,b. The side sections 260a,b are formed from wire segments that are predominantly in a direction parallel to the axis 150, while the end turn sections 270a,b are formed from wire segments that follow paths that are predominantly within planes that are perpendicular to the shaft. The outward-facing edge 250 similarly includes two side sections and two end turn sections.

Returning to FIG. 1, the rotor 100 further is shown to include four inner wedges 160a–d and four outer wedges 170a–d. All of the inner and outer wedges 160a–d and 170a–d are approximately trapezoidal in shape. That is, each of the wedges 160a–d and 170a–d includes a respective short side 180, a respective long side 185, and two respective connecting sides 190. Although approximately trapezoidal in shape, the outer wedges 170a–d in the present embodiment have long sides 185 that are curved rather than straight. As shown, the outer wedges 170a–d are wedged in between the coils 140a–d of neighboring poles 130a–d. Specifically, the connecting sides 190 of outer wedge 170a are respectively in contact with the first side portion 220a of the first coil 140a and the first side portion 220a of the second coil 140b. The two connecting sides 190 of the second outer wedge 170b are respectively in contact with the second side portion 220b of the second wire coil 140b and the first side portion 220a of the third coil 140c. The connecting sides 190 of the third outer wedge 170c are respectively in contact with the second side portion 220b of the third wire coil 140c and the second side portion 220b of the fourth wire coil 140d. Finally, the two connecting sides 190 of the fourth outer wedge 170d are respectively in contact with the second side portion 220b of the first wire coil 140a and the first side portion 220a of the fourth wire coil 140d.

The connecting sides 190 of the outer wedges 170a–d act as physical barriers to retain the wire windings of the coils 140a–d in place during operation of the rotor 100, and further provide pressure to the coils. In order to serve these functions, however, the outer wedges 170a–d must themselves be retained in place during operation of the rotor 100, to prevent the centrifugal forces experienced by the outer wedges from causing the wedges to move radially outward away from the shaft 110 and the coils 140a–d.

In order to prevent or limit such outward radial movement, the outer wedges 170a–d are coupled to the inner wedges 160a–d. As shown, the inner wedges 160a–d are prevented or limited from moving radially outward because the connecting sides 190 of the inner wedges rest upon corresponding side sections 260a,b of the inward-facing edges 240 of the wire coils 140a–d. Specifically, the connecting sides 190 of the first inner wedge 160a rest upon a first side section 260a of the first wire coil 140a and a first side section 260a of the second wire coil 140b. The connecting sides 190 of the second wedge 160b respectively rest upon a second side section 260b of the second wire coil 140b and the first side section 260a of the third wire coil 140c. The two connecting sides 190 of the third inner wedge 160c respectively rest against the second side section 260b of the third wire coil 140c and the second side section 260b of the fourth wire coil 140d. Finally, the connecting sides 190 of the fourth inner wedge 160d respectively rest against the first side section 260a of the fourth wire coil 140d and the second side section 260b of the first coil 140a.

Because the inner wedges 160a–d rest against the side sections 260 of the wire coils 140a–d, both the inner wedges and outer wedges 170a–d are limited from moving radially outward despite the centrifugal forces experienced by the rotor 100 during operation. Although it is possible for the inner wedges 160a–d in some embodiments to move slightly outward radially, such movement tends to apply additional pressure to the coils 140a–d until an equilibrium is reached, at which point the inner wedges cannot move further radially outward. Thus, by coupling the outer wedges 170a–d to the inner wedges 160a–d, the outer wedges can be retained in approximately the same radial position throughout operation of the rotor 100.

Further as shown in FIG. 1, each of the outer wedges 170a–d includes six small channels 195 that are capable of conducting coolant such as oil (or another fluid). Specifically, three of the six channels 195 of each of the wedges 170a–d are positioned along each of the connecting sides 190 of the respective outer wedges 170a–d. As shown, the channels 195 are spaced approximately equally apart from one another and are equal in cross-sectional size relative to one another. However, the spacing, number, sizes and shapes of the channels 195 can vary depending upon the embodiment. By conducting coolant through the channels 195, heat that is generated by the coils 140a–d is removed from the coils. Additionally as shown in FIG. 1, each of the outer wedges 170a–d includes a large channel 198 that is also capable of conducting coolant (or other fluid). Although in the present embodiment no channels are shown within the inner wedges 160a–d, in alternate embodiments these wedges also can include one or more channels for conducting coolant or other fluid. Further, in certain embodiments it will be the case that all or virtually all of the fluid conducting channels are in the inner rather than the outer wedges.

Figure 3:
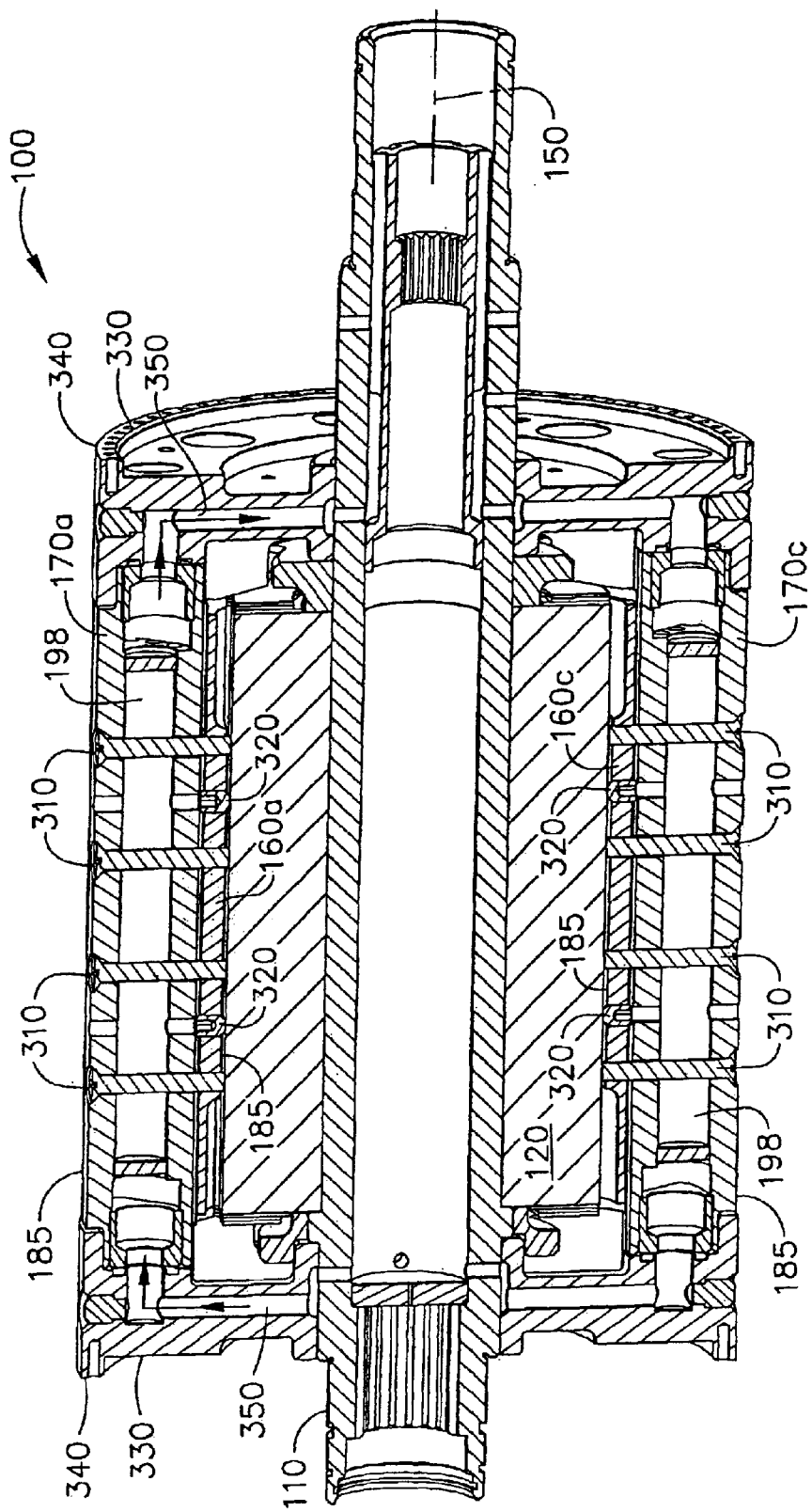
FIG. 3 is another perspective, cross-sectional view of the rotor of FIG. 1.

Referring to FIG. 3, another cross-sectional view of the rotor 100, taken along the axis 150 through the shaft 110 and further taken through the centers of outer wedges 170a and 170c and inner wedges 160a and 160c, is provided in order to show additional elements that are utilized to couple the wedges to one another and to position the wedges. Specifically, in the embodiment shown, attachment screws 310 are employed to couple the outer wedges 170a–d respectively to the inner wedges 160a–d. In alternate embodiments, other fastening devices can be used such as bolts and nuts, or even adhesives. However, in the preferred embodiment, coupling between the outer and inner wedges 170a–d and 160a–d is preferably provided by way of fastening devices that can adjust the relative spacing between the outer and inner wedges. By using such fastening devices, exact positioning of the outer and inner wedges 170a–d and 160a–d around the rotor 100 can be achieved to provide proper balancing of the rotor and concentricity control. Additionally as shown in FIG. 3, jack screws 320 are employed within the inner wedges 160a–d that extend through the long sides 185 of the inner wedges and protrude radially inward toward the laminations 120. By adjusting these jack screws 320, it is possible to adjust the spacing of the inner wedges 160a–d with respect to the laminations 120 and also adjust the pressure applied by the inner wedges with respect to the coils 140a–d. In certain embodiments, other spacing (or fastening) devices are employed other than the grub screws 320, or no such devices are employed at all.

Further referring to FIG. 3, the rotor 100 is shown to include two end caps 330 at each end of the rotor. The end caps 330 respectively fit onto the ends of the rotor, and lips 340 of the end caps extend over (that is, around) the long sides 185 of the outer wedges 170a–d. Additionally, channels 350 are shown to extend radially inward from the lips 340 of the end caps 330 through the laminations 120 into the shaft 110. The channels 350 are further coupled to at least the large channels 198. Thus, coolant (or other fluid) can be provided to the large channels 198 from the shaft 110 and then returned to the shaft. Depending upon the embodiment, small channels 195 also can be coupled to the channels 350.

As shown in FIG. 3, the inner wedges 160a–d extend axially only about three quarters of the axial length of the outer wedges 170a–d; however, in alternate embodiments, the axial length of the inner wedges 160a–d can be equal to that of the outer wedges 170a–d or otherwise different from that shown. However, regardless of the embodiment, the inner wedges 160a–d occupy at least the axial region approximately at the axial center of the rotor 100. This is because the centrifugal forces acting upon the outer wedges 170a–d during operation of the rotor 100 tend to cause flexure or bending of the outer wedges especially at their axial center, and consequently the jack screws 310 coupling the inner wedges 160a–d to the outer wedges in particular limit such flexure of the outer wedges.

Although in the present embodiment, support for the outer wedges 170a–d is particularly provided by coupling the outer wedges to the inner wedges 160a–d and also by providing the end caps 330, the rotor 100 can further employ other techniques for assisting in retaining the outer wedges 170a–d as well. For example, in FIG. 1, each of the poles 140a–d includes flanges 360 that extend past the side portions 220a–b of the respective coil 140a–d around that pole. The flanges 360 can further limit the outward radial movement of the outer wedges 170a–d. Additionally, although not shown, in certain embodiments the rotor 100 can also include bands that surround the outer circumference of the rotor and thereby provide additional support for the outer wedges 170a–d. The teachings of the present invention are meant to include combinations of conventional techniques for the retention of wedges with the new techniques described herein.

Figure 4:
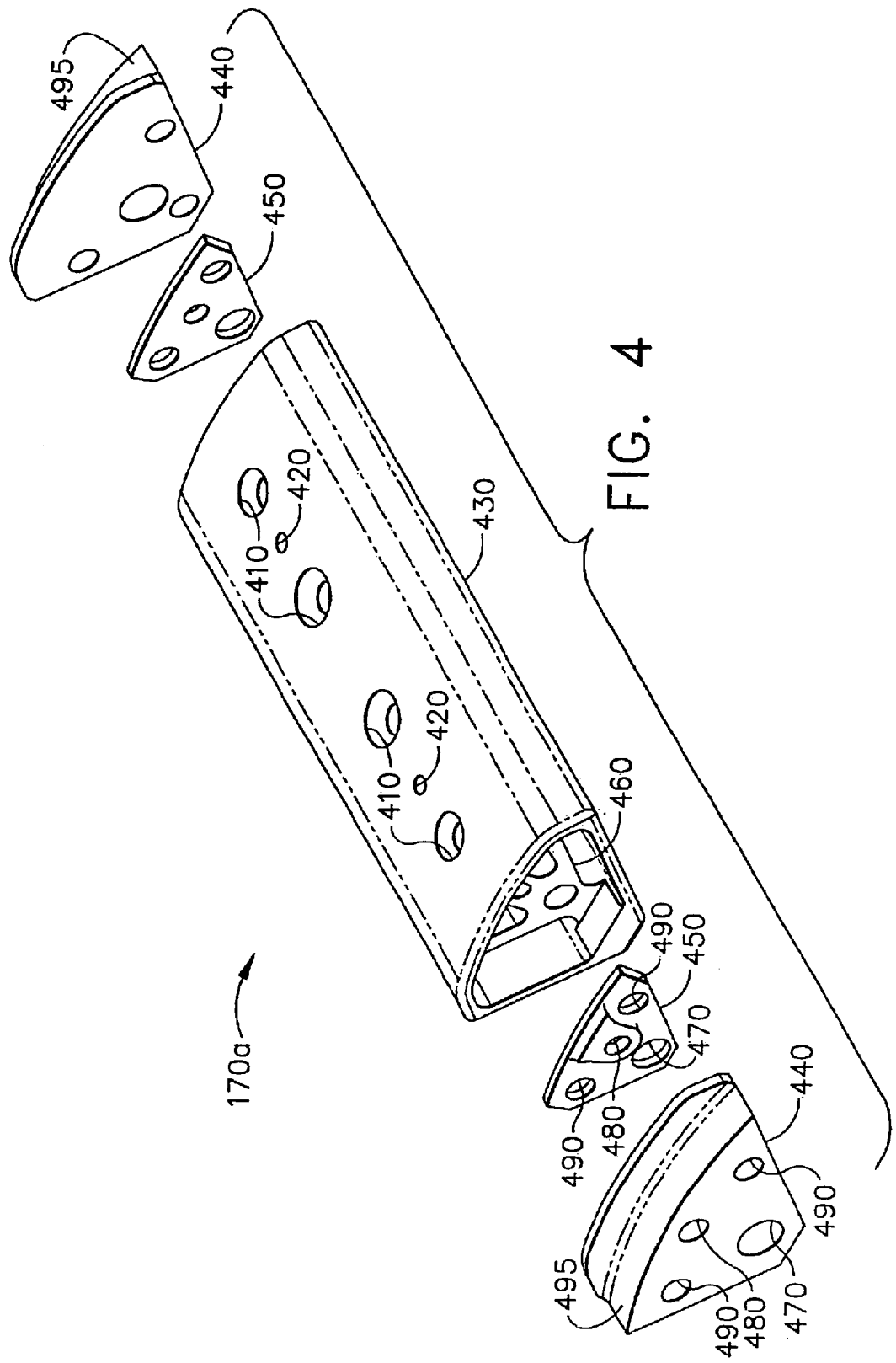
FIG. 4 is an exploded view of one embodiment of an outer wedge such as that employed in the rotor of FIG. 1.

Referring to FIG. 4, an exemplary embodiment of one of the outer wedges 170a is shown in an exploded view. As shown, the outer wedge 170a includes four holes 410 for the attachment screws 310, as well as two additional holes 420 for the jack screws 320. The outer wedge 170a includes a main body 430 that is predominantly hollow and also includes two end pieces 440 that attach to the main body 430 to complete the outer wedge. Specifically, the end pieces 440 attach to two intermediate pieces 450, which in turn attach to inner supports 460 within the main body 430. The supports 460 can be attached to the main body in any one of a number of ways including brazing and welding. More specifically, the end pieces 440 and intermediate pieces 450 are attached to the supports 460 by way of axial screws (not shown) that extend into holes 490 in the ends 440. The ends 440 and intermediate elements 450 include primary holes 470 and secondary holes 480 through which coolant (or other fluid) is provided into and returned out of the outer wedge 170a.

This particular embodiment of the outer wedge 170a is a preferred embodiment that provides particular structural strength preventing the outer wedge from bending radially outward during operation of the rotor 100. The axial screws provide structural support within the outer wedge 170a and thereby limit flexure of the outer wedge during rotation of the rotor. Additionally, because the outer wedge is hollowed out, the centrifugal forces upon the outer wedge are minimized. Further, the end pieces 440 have ridges 495 over which the lips 340 of the end caps 330 extend to provide additional support.

Figure 5:
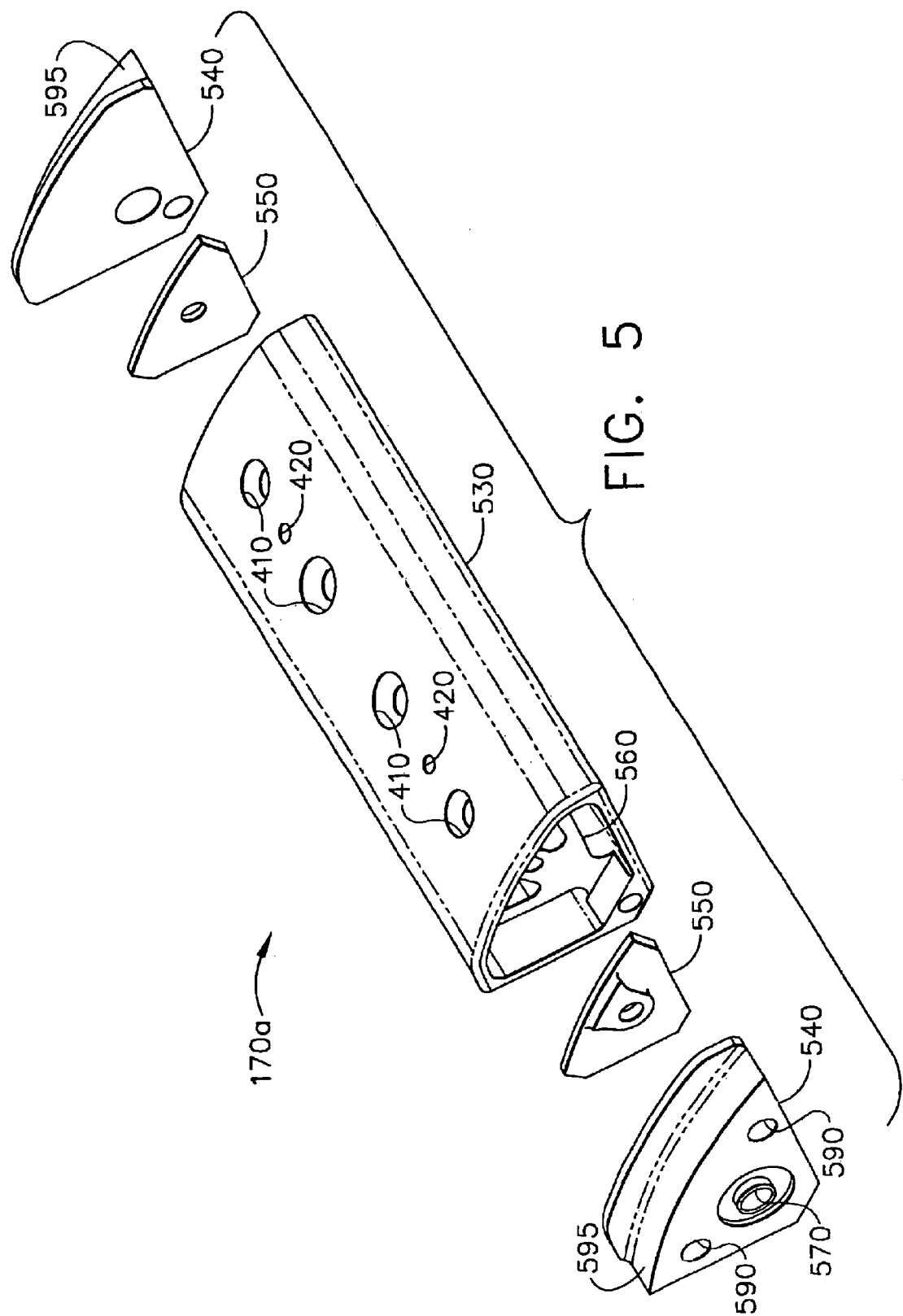
FIG. 5 is an exploded view of a second embodiment of an outer wedge such as that employed in the rotor of FIG. 1.

A variety of alternate embodiments of the outer wedge 170a are possible. For example, in FIG. 5, the outer wedge 170a includes a main body 530 with supports 560, and end pieces 540 and intermediate pieces 550 are coupled to the supports of the main body by way of axial screws (not shown) that fit into holes 590. Also, coolant is provided into and out of the outer wedge 170a by way of a single hole 570. Again, the end pieces 540 include ridges 595 over which the lips 340 of the end caps 330 can extend.

Figure 6:
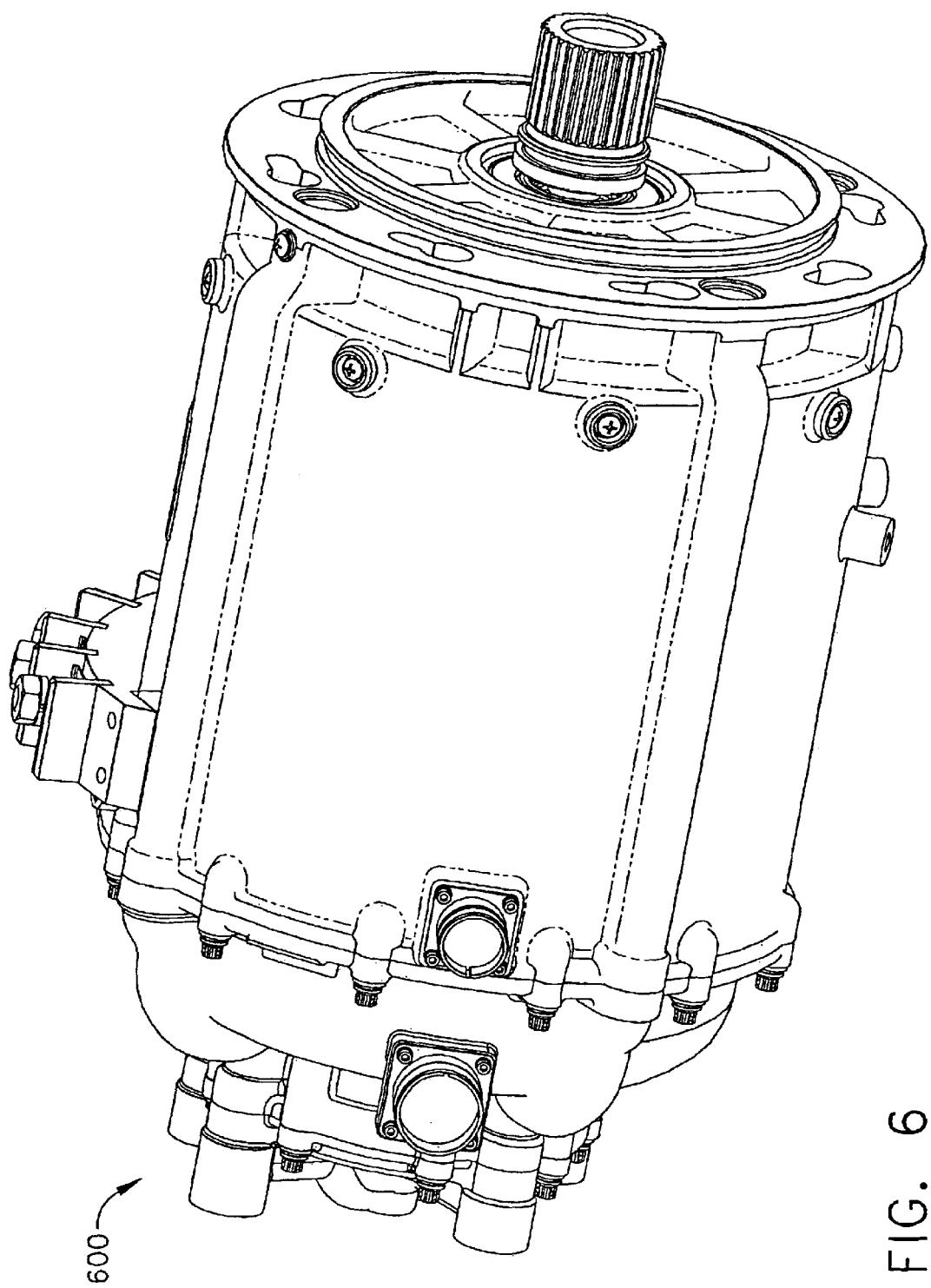
FIG. 6 is a perspective view of a generator in which the rotor of FIG. 1 can be employed.

Referring to FIG. 6, a perspective view of a generator capable of employing a rotor such as the rotor 100 is provided. Although as shown in FIG. 1, the rotor 100 includes four poles 130a–d and corresponding coils 140a–d, in alternate embodiments the rotor can have a different number of poles and/or coils. Further, in alternate embodiments, the system and method for retaining wedges within the rotor can also be employed in the rotors of motors and other electric mechanical machines.

While the invention has been described with reference to a preferred embodiment, it will be understood by those skilled in the art that various changes may be made and equivalents may be substituted for elements thereof without departing from the scope of the invention. In addition, many modifications may be made to adapt the teachings of the invention to a particular situation without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a high speed generator including a rotor having coils of wire windings wrapped around respective poles of the rotor, each coil including a respective outer face having two end turn portions and two side portions, a method of adjusting concentricity of the rotor, the method comprising:

positioning inner wedges between opposing sides of the coils of neighboring poles the inner wedges having one or more first threaded openings;

positioning outer wedges between opposing side portions of the coils of neighboring poles, the outer wedges having one or more second threaded openings collocated with the first threaded openings;

placing one or more threaded fasteners into collocated first and second threaded openings; and adjusting concentricity of the rotor by adjusting the threaded fasteners.

2. A method of retaining wedges of a rotor from moving radially outwards away from a shaft of the rotor during rotation of the rotor, the method comprising:

wrapping coils of wire windings around respective poles of the rotor, wherein each coil includes a respective outer face including two end turn portions and two side portions, and further includes a respective inward-facing edge including two end turn sections and two side sections;

positioning inner wedges between opposing side sections of the coils of neighboring poles;

positioning outer wedges between opposing side portions of the coils of neighboring poles;

coupling the outer wedges to the inner wedges through the use of fastening devices; and tightening the inner wedges against the side sections with which the inner wedges are in contact by adjusting jack screws against a core of the rotor and thereby forcing the inner wedges radially outward away from the shaft.

3. The method of claim 2, further comprising:

adjusting the concentricity of the outer wedges by adjusting the fastening devices; and shrink-fitting an end cap over ridges on outer sides of the outer wedges.

4. The method of claim 2, further comprising:

providing extensions onto the poles that provide further support for the outer wedges; and positioning bands around the rotor, wherein the outer wedges are provided with internal channel, through which coolant can flow.

* * * * *

UNITED STATES PATENT AND TRADEMARK OFFICE
CERTIFICATE OF CORRECTION

PATENT NO. : 6,979,929 B2 Page 1 of 1
APPLICATION NO. : 10/869553
DATED : December 27, 2005
INVENTOR(S) : G.E. Tornquist et al.

It is certified that error appears in the above-identified patent and that said Letters Patent is hereby corrected as shown below:

In Column 10 line 15 claim 4, delete "channel," and add --channels--

Signed and Sealed this

Second Day of October, 2007

JON W. DUDAS
*Director of the United States Patent and Trademark Office*